Dec. 29, 1964   E. F. BOYER   3,163,234
ONION HARVESTER
Filed Aug. 14, 1963
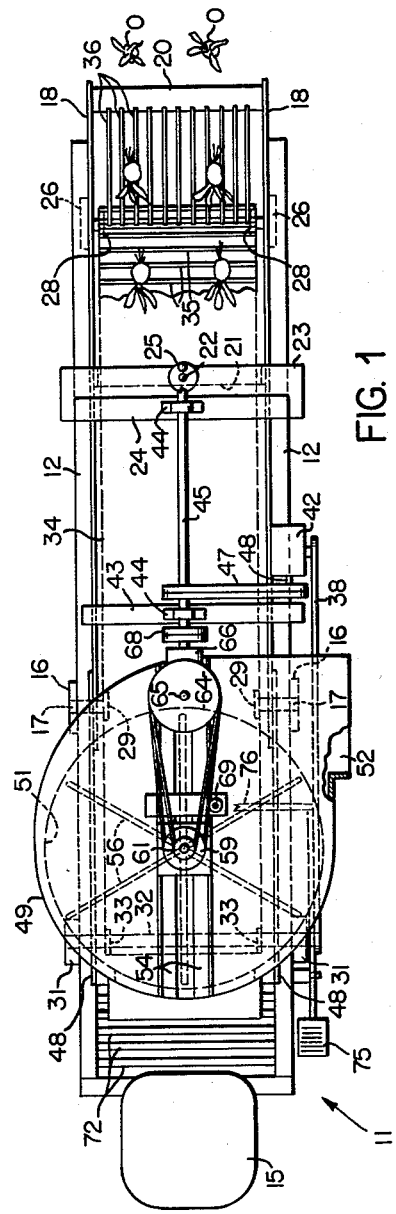
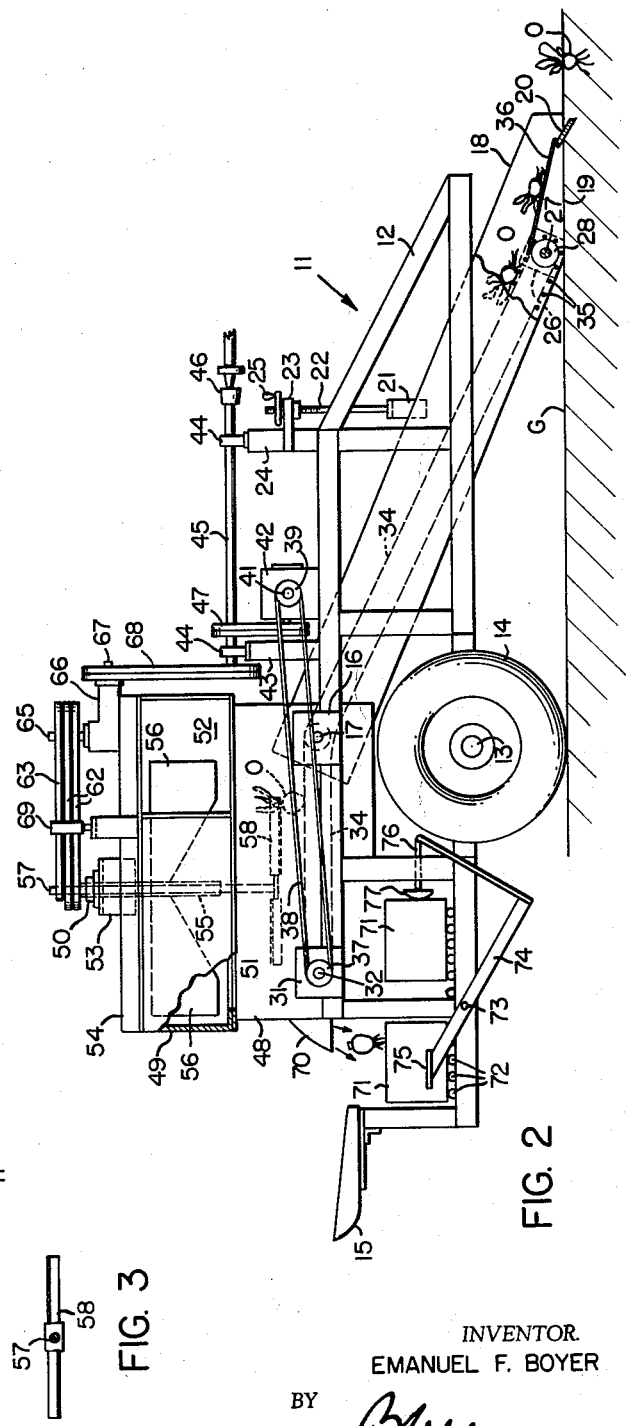
INVENTOR.
EMANUEL F. BOYER
BY
*[signature]*
ATTORNEY

United States Patent Office 3,163,234
Patented Dec. 29, 1964

3,163,234
ONION HARVESTER
Emanuel F. Boyer, Barre Center, N.Y.
(R.D. 2, Albion, N.Y.)
Filed Aug. 14, 1963, Ser. No. 302,163
2 Claims. (Cl. 171—17)

This invention relates to an onion harvester, and more particularly to a machine for use directly in the fields for uprooting and topping onions.

In prior onion harvesting and topping machines the uprooted onions were conveyed over a blower blowing a blast of air from beneath the onions to lift the tops of the onions into position to be cut by a reciprocating sickle bar on the machine. The severed tops were blown upwardly into a stack above the sickle bar, whence the tops were discharged.

The prior harvesting machines did not operate efficiently because when the air is blown upwardly from beneath the onions it has to pass around the onions, and is thereby deflected. Moreover, the severed onion tops tended to clog the stack, so that when the next batch of onions arrived beneath the sickle bar, the air flow was cut off momentarily, thereby permitting the severed tops that had clogged in the discharge stack to drop down onto the conveyor, mixing the onion tops with the newly-arriving batch of onions. Because the blower was placed below the onion conveyor belt the machines had to be relatively large and bulky machines—on the order of twenty-three feet long and ten to twelve feet wide, with the result that before a machine could be put to use it was necessary first to harvest ten or twelve rows of onions by hand adjacent the edge of a field, in order to provide starting room for the machine.

A primary object of the present invention is to provide an onion harvesting and topping machine which will be more efficient than prior such machines.

Another object of the invention is to provide an onion harvesting and topping machine which is substantially more compact than prior such machines.

A further object of this invention is to provide an onion harvesting machine which can be placed into immediate operation in a field without first having a harvest several rows of onions by hand.

Another object of this invention is to provide a machine of the character described in which clogging of tops is eleminated and in which the tops will be handled and discharged in convenient and efficient manner.

Other objects of the invention will be apparent hereinafter from the specification and from the recital of the appended claims, particularly when read in conjunction with the accompanying drawing.

In the drawing:

FIG. 1 is a plan view of an onion harvesting machine made in accordance with one embodiment of this invention, parts thereof being cut away for better illustration;

FIG. 2 is a side elevational view of this machine again with parts thereof cut away; and FIG. 3 is a plan view of the cutter used in this machine.

The machine illustrated is adapted to be drawn by a tractor over the onion field which is to be harvested. The machine has a digging blade at its front end; and as the machine is drawn along it lifts the onions out of the ground and onto a conveyor which carries them upwardly and rearwardly and beneath a suction fan that is mounted above the conveyor. The suction fan lifts the tops of the onions into the path of a rotating cutter which is mounted coaxially of the fan and is disposed just beneath the fan. The cutter severs the tops from the onions and the fan blows them out of a discharge opening and they fall back onto the ground. The topped onions are carried rearwardly by the conveyor and drop into a crate carried by the machine. When the crate is filled with topped onions, it can be removed and replaced by an empty crate. Hence as the machine travels over the field it harvests the onions, tops and crates them.

Referring now to the drawing by numerals of reference, 11 designates generally the onion harvesting and topping machine, comprising a pair of side frame members 12 which are supported in laterally-spaced, parallel relation on an axle 13 (FIG. 2) supported by two wheels 14. Mounted on a vertical support at the rear end of the side frame members 12 is a seat 15 for the rider or operator of the machine. Secured to the outside of each frame member 12 adjacent its upper edge, and substantially midway between opposite ends of the member, is a bearing block 16. Rotatably journaled in each block 16 and projecting therefrom beyond the inner face of the associated frame member 12 is a shaft 17. The shafts 17 are axially aligned with one another.

Pivotally mounted adjacent one end on the shafts 17, and extending, in use, diagonally downwardly beyond the front ends of the frame members 12 are two laterally spaced side rails 18.

Rigidly secured between the forward ends of the side rails 18 to project diagonally forwardly and downwardly beyond the lower edges 19 thereof is a digging blade or scoop 20.

Substantially midway between its ends, each side rail 18 is secured to one of the legs of an inverted, U-shaped bracket 21 (FIG. 2) in the center of which is secured the lower end of a vertically disposed adjusting screw shaft 22. The screw shaft 22 is threaded at its upper end, and threads through a bracket 23, which is secured to and projects from a strap support 24 that extends between the side frame members 12. A crank 25, which is secured onto the upper end of the screw shaft 22, is manually rotatable to pivot the side rails 18 about the shafts 17 and adjust the depth of entry into the ground G of the digging blade 20.

Spaced rearwardly of the blade 20, and journaled at opposite ends in bearing blocks 26 carired by the side rails 18 is a shaft 27. Secured to the shaft 27 adjacent opposite ends thereof, respectively, are two sprocket wheels 28. Secured to the inner end of each of the shafts 17 to align with one of the sprocket wheels 28 is a sprocket wheel 29. Mounted at opposite ends thereof to rotate in bearing plates 31 secured to the side frame members 12 rearwardly of the shafts 17 is a shaft 32. Secured on shaft 32 adjacent the inner face of each frame member 12 is a sprocket wheel 33. Mounted to travel about the sprockets 28 and 33, and disposed so that its upper reach passes over the idler sprockets 29, is an endless conveyor belt 34. The belt 34 is of conventional design, and comprises a plurality of spaced, parallel rods 35 and chains (not illustrated) which carry the rods and which travel on the sprockets 28, 29 and 33.

Pivoted at their forward ends to the blade 20, and resting at their rear ends on the conveyor belt 34 above the shaft 27 are a plurality of laterally spaced, parallel vibrator bars 36.

The belt 34 is driven from a gear reduction unit 42 through the shaft 41 of this unit, a sprocket 39, chain 38 and sprocket 37. Sprocket 37 is secured to the outer end of the shaft 32 at the exterior of one of the frame members 12 (the member 12 shown at the lower side of FIG. 1). The unit 42 is mounted on one of the side frame members 12.

Rotatably journaled at opposite ends in bearings 43 carried on the support 24 and a second supporting bracket 44 is a drive shaft 45 which is adapted to be connected by a conventional coupling 46 to the drive mechanism of the tractor or other vehicle which tows the machine 11. Adjacent its rear end shaft 45 is connected by a conventional double sheave and belt drive 47 to the input shaft 48 of the gear box 42, so that upon rotation of the shaft 45 the output shaft 41 of the unit 42 is driven thereby to actuate the conveyor 34.

Secured to and projecting above the upper edges of the side frame members 12 adjacent the rear ends thereof are two, parallel, side panels 48. Supported on the upper edges of the side panels 48 is a fan housing 49. In its lower end the fan housing 49 has an inlet opening 51. The outlet or discharge opening of the housing 49 is denoted at 52. Rotatably journaled at one end in a bearing 53 carried by a pair of parallel angle irons 54 on the top of the fan housing 49 is a tubular fan shaft 55. The fan shaft 55 extends downwardly and has a plurality (six in the embodiment illustrated) of fan blades 56 secured to and projecting radially outwardly therefrom in the housing 49. Rotatably journaled at one end thereof in a bearing 50 carried by the bearing 53, and extending downwardly through the tubular fan shaft 55 in radially spaced, coaxial relation therewith, is a shaft 57. At its lower end the shaft 57 has secured thereto a cutter blade 58 (FIG. 2), which rotates in a plane spaced slightly above and parallel to the conveyor 34 where the latter passes between the side panels 48. Blade 58 may be formed by bending sharp, marginal edge portions of a flat plate, which are spaced on opposite sides of a center portion of the plate, diagonally downwardly, and in opposite directions.

At their upper ends the shafts 55 and 57 have secured thereon double and single sheaves 59 and 61, respectively, which are connected by the double and single belts 62 and 63, respectively, are carried respectively to a triple sheave 64 secured to the output shaft 65 of a gear box 66 carried by the angle irons 54 above the fan housing. The input shaft 67 of the gear box 66 is connected by a double sheave and belt system 68 to the drive shaft 45 for rotation thereby. A belt-tightening roller 69 is mounted on angle irons 54 to rotate in engagement with the belts 62.

Onions, which are topped by cutter 58, as will be described further hereinafter, are carried rearwardly of the machine and discharged by chute 70 into crates 71 removably positioned for this purpose on the machine.

Mounted between the rear ends of the side frames 12 in the space between the seat 15 and the rear end of the conveyor 34 are a plurality of rollers 72. These are adapted to support the crates 78 that are to be filled with onions topped by the machine.

Pivoted intermediate its ends on a shaft 73 carried by one of the side frames 12 is a lever 74. At one end thereof lever 74 carries a foot pedal 75, and its opposite end is connected by a rigid linkage 76 with a pusher head 77.

For use the machine 11 is connected adjacent its forward end to a tractor or similar vehicle; and the shaft 45 is coupled to the drive mechanism of the tractor. The tractor supports the side frame members 12 so that their lower edges are disposed in the substantially horizontal position as illustrated in FIG. 2. The crank 25 may be rotated to raise or lower the digging blade 20 so that it will project downwardly into the ground G a depth sufficient to pass just beneath and uproot the onions (schown schematically at O in the drawing) which are to be processed.

In operation, the machine is drawn parallel to the rows of onions to be harvested so that the onions are uprooted by the blade 20 and forced by the forward progress of the machine upwardly onto the vibrator bars 36 and thence onto the conveyor 34. The drive shaft 45 rotates in a direction to cause the onions to be carried by conveyor 34 upwardly and rearwardly beneath the cutting blade 58. The shaft 45 also rotates, at different speeds, both the fan blades 56 and the cutter blade 58. Both the blades 56 and the downwardly projecting cutting edges of blade 58 are shaped to cause air to be drawn or sucked upwardly. As the air is drawn upwardly into the inlet opening 51 in the fan housing it raises the leafy tops of the onions, which are at the moment being conveyed beneath the cutter 58, into the path of the rotating cutter to be severed thereby. The tops cut from the onions are sucked into the fan housing 49 and exhausted through the port 52 and drop onto the ground at the side of the machine. The topped onions themselves are conveyed to the rear of the machine by conveyor 34 and fall into the crate 71 which is positioned in front of the seat 15. The hood 70 prevents discharged onions from striking the occupant of the seat 15.

When one crate 71 is filled, it can be lifted by hand off the machine; and the operator can press downwardly on foot treadle 75 so that the lever 74 pivots (counterclockwise in FIG. 2) and urges the pusher 77 rearwardly causing an empty crate 71 to be moved into position to be filled. However, the treadle 75 can also be used to actuate pusher 77 to push a filled crate off the rollers 72 under the operator's seat 15 onto the ground, and to move into position a new crate to be filled with processed onions. Another empty crate is then placed on rollers 72.

From the foregoing it will be apparent that applicant has provided a simple, and efficient machine for rapidly harvesting and topping onions. By mounting the cutting blade and fan 56 coaxially of one another, and above the conveyor 34, it has been possible for applicant to construct a machine having an overall width of only about thirty-eight inches, and a length of only approximately ten feet. With such a compact machine it is unnecessary to harvest several rows of onions by hand before the machine can start harvesting. Moreover, since the tops of the onions are raised into the path of the cutter 58 through the use of a suction device placed above the conveyor, rather than by a blast of air from beneath the conveyor, there is no tendency for the severed tops to clog anything or for them to drop back down onto the conveyor. By employing the vibrator bars 36, there is less tendency for dirt and foreign matter to be conveyed upwardly and into the area beneath the cutter blade 58 where it might interfere with the upward flow of air. As the transverse bars 35 of the conveyor 34 pass beneath the free ends of the vibrator bars 36, the latter are made to vibrate rapidly upwardly and downwardly thereby tending to cause lumps of dirt and the like to sift downwardly between the bars before the onions pass onto the conveyors 34. A machine of practical capacity can be built according to the present invention which will weigh only about half a ton as compared to the four or five ton weight of previous machines.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A machine for harvesting and topping onions, comprising (a) a carriage adapted to be advanced along a row of onions, (b) a housing mounted on said carriage adjacent the rear thereof, (c) a tool mounted on said carriage adjacent the forward end thereof for uprooting onions during the advance of the carriage, (d) a conveyor extending rearwardly from said tool and through said housing to transport uprooted onions rearwardly from said tool to a discharge point at the rear of said carriage, (e) a suction fan for creating a vacuum in said housing above said conveyor to draw air upwardly through said conveyor and into an opening in the bottom of said housing, (f) said fan comprising a rotary, hollow fan shaft rotatably mounted at its upper end in the top of said housing, and having a plurality of fan blades projecting radially therefrom adjacent its lower end, (g) a second rotary shaft rotatably mounted adjacent its upper end in the top of said housing and extending through the bore of said fan shaft to rotate therein, (h) a cutter blade secured intermediate its ends to the lower end of said second shaft to rotate therewith in said housing beneath said fan and above said conveyor and, (i) means for simultaneously rotating said fan shaft and said second shaft at different speeds, respectively whereby the air drawn upwardly by said fan causes the tops of the onions on said conveyor to be lifted into engagement with said cutter blade to be severed thereby, (j) said housing having in one side thereof an exhaust port through which the severed tops of said onions are discharged by force of said fan.

2. A machine for harvesting and topping onions, comprising (a) a carriage adapted to be advanced along a row of onions in a field, (b) means on the front of said carriage for uprooting onions during the advance of the carriage, (c) a cutter mounted on said carriage rearwardly of said uprooting means, (d) a conveyor for transporting uprooted onions beneath said cutter, (e) a housing mounted above said cutter and having in its bottom an inlet opening, which registers with said cutter, and an exhaust opening in its side, (f) a suction fan rotatably mounted in said housing and operative to draw the tops of uprooted onions, as they are carried rearwardly by said conveyor, into engagement with said cutter to be severed thereby, and to draw the cut tops into said housing through said inlet opening, and to discharge said cut tops out of said discharge opening, (g) said fan comprising a hollow, rotatable shaft in said housing extending transverse to the surface of the conveyor, and a plurality of radially projecting fan blades secured to said shaft in said housing, (h) a second rotatable shaft extending through said hollow shaft coaxially thereof, (i) said cutter being an elongate blade secured intermediate its ends to said second shaft between said conveyor and said fan blades, and (j) means for simultaneously rotating said shaft.

References Cited by the Examiner

UNITED STATES PATENTS 2,553,519  5/51  Lenz _____ 171—31
2,931,157  4/60  Smith et al. _____ 56—25.4

FOREIGN PATENTS 629,943  9/49  Great Britain.

T. GRAHAM CRAVER, *Primary Examiner.*
ANTONIO F. GUIDA, *Examiner.*